US00RE35083E

United States Patent [19]

Roosevelt

[11] E Patent Number: Re. 35,083

[45] Reissued Date of Patent: Nov. 7, 1995

[54] THORACIC WEIGHTLIFTING BENCH

[76] Inventor: Andrew Roosevelt, 235 E. 61st St., New York, N.Y. 10021

[21] Appl. No.: 15,387

[22] Filed: Feb. 8, 1993

Related U.S. Patent Documents

Reissue of:

[64] Patent No.: 5,147,260
Issued: Sep. 15, 1992
Appl. No.: 745,735
Filed: Aug. 16, 1991

U.S. Applications:

[63] Continuation-in-part of Ser. No. 572,436, Aug. 27, 1990, Pat. No. 5,039,090.

[51] Int. Cl.[6] ..... A63B 21/078

[52] U.S. Cl. ..... 482/104; 482/142

[58] Field of Search ..... 482/93, 104, 123, 482/133, 142, 148; 128/68, 69, 70, 845; 606/240, 241; 5/621, 622, 636

[56] References Cited

U.S. PATENT DOCUMENTS

| | | | |
|---|---|---|---|
| 1,869,460 | 8/1932 | Brand | 606/240 |
| 1,904,039 | 4/1933 | Bruder | 128/69 |
| 2,720,660 | 10/1955 | Smith | 5/636 |
| 3,555,582 | 1/1971 | Radford | 5/636 X |
| 4,230,099 | 10/1980 | Richardson | 128/69 |
| 4,423,865 | 1/1984 | Mahnke | 482/104 |
| 4,424,599 | 1/1984 | Hannouche | 5/636 X |
| 4,474,370 | 10/1984 | Oman | 482/104 X |
| 4,621,809 | 11/1986 | Pearl | 482/104 |
| 4,635,934 | 1/1987 | Roethke | 482/142 |
| 4,641,837 | 2/1987 | Ruth | 482/104 |
| 4,645,196 | 2/1987 | Christie | 482/104 |
| 4,653,751 | 3/1987 | Green | 482/142 |
| 4,705,267 | 11/1987 | Jackson | 482/104 X |
| 4,749,190 | 6/1988 | Jennings | 482/142 |
| 4,756,090 | 7/1988 | Pedrow | 606/240 |
| 4,861,025 | 8/1989 | Rockwell | 482/142 |
| 4,905,993 | 3/1990 | Barone | 482/104 |
| 4,915,377 | 4/1990 | Malnke et al. | 482/142 X |
| 4,953,857 | 9/1990 | Lemire | 482/104 |
| 4,960,277 | 10/1990 | LaRossa et al. | 482/104 |

FOREIGN PATENT DOCUMENTS

| | | | |
|---|---|---|---|
| 3423837 | 1/1986 | Germany | 482/104 |

OTHER PUBLICATIONS

The Kölbel Training Bench Disclosed In Inhalt Magazine, pp. 132–133, Dec. 1983.

*Primary Examiner*—Richard J. Apley
*Assistant Examiner*—John Mulcahy
*Attorney, Agent, or Firm*—William E. Pelton; Donald S. Dowden

[57] ABSTRACT

A weightlifting bench for performing the bench press exercise comprising a substantially longitudinally arcuate curve for conforming to the thoracic region of a weightlifter's back. The arcuate curve has a chord with a length of 8.5 inches defined by the end points of the arcuate curve. The arcuate curve begins to ascend and increases to ⅛, 3/16, ¼, 7/16 and 17/32, inches respectively, measured from points on the arcuate curve to evenly spaced points on the chord. When the arcuate curve passes its midpoint, the distance from the curve to the chord decreases to ½, 7/16, 3/16, ⅛ inches, respectively, measured at evenly spaced points along the chord.

4 Claims, 3 Drawing Sheets

FIG. 1
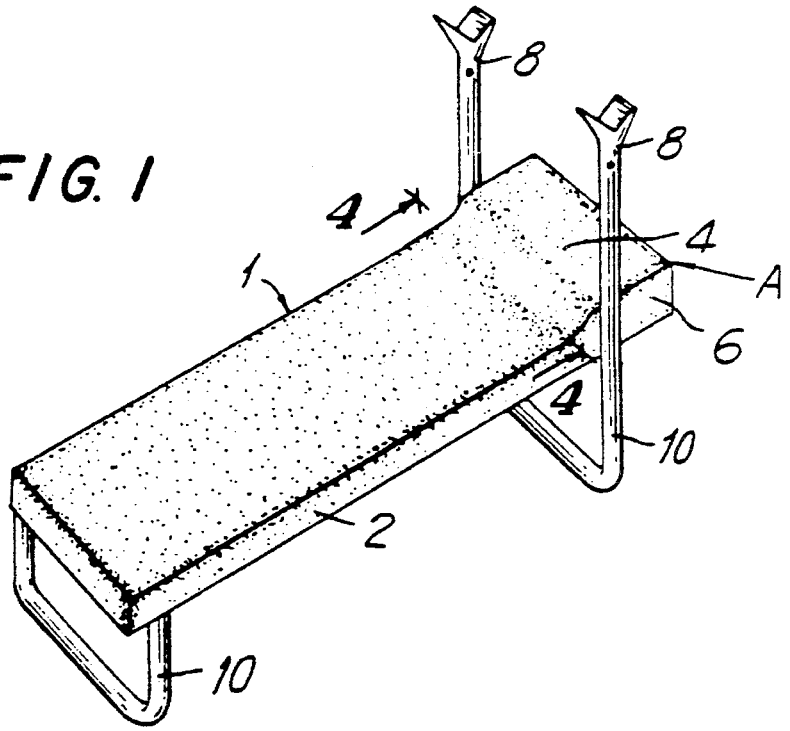
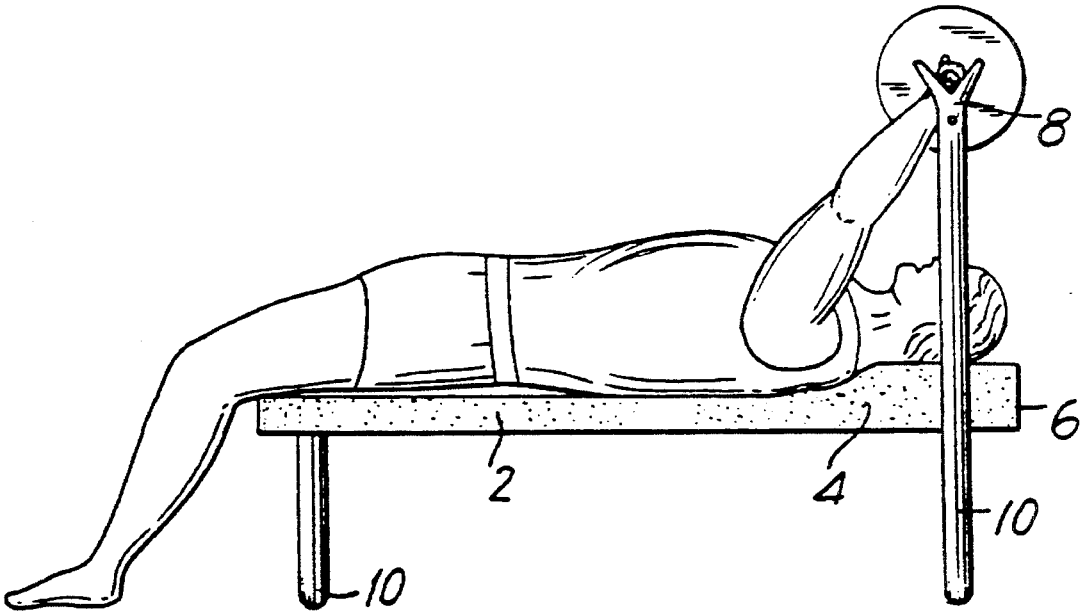
FIG 2

THORACIC WEIGHTLIFTING BENCH

Matter enclosed in heavy brackets [ ] appears in the original patent but forms no part of this reissue specification; matter printed in italics indicates the additions made by reissue.

This is a continuation-in-part of application Ser. No. 07/572,436, filed Aug. 27, 1990 now U.S. Pat. No. 5,039, 090.

FIELD OF THE INVENTION

This invention relates generally to exercise devices and more particularly to a weightlifting bench for performing a bench press exercise.

BACKGROUND OF THE INVENTION

Exercise devices that tone and develop muscles are known heretofore. In particular, there exist devices that may be used to perform exercises to develop the pectoral muscles of the body namely, exercise devices which are adapted for use on performing the exercise known as the bench press. Such devices generally consist of a foam padded board that is approximately 3.5–4.5 feet in length and about 1 foot wide. The board is supported by four legs and at one end, has a weight support structure for releasably holding a conventional barbell.

When performing the bench press, the weightlifter lies flat on the board with the feet overhanging the end opposite to the weight support structure. The weightlifter grasps the barbell and removes it from the weight support structure, permits the barbell to slowly fall to his chest, and then pushes it upward until his arms are fully extended. This motion is called a repetition and the weightlifter usually performs many repetitions in a set.

A common problem in bench pressing is the tendency for the weightlifter to injure the lower back by putting pressure on the lumbar spine when the back is arched during a repetition. Another common problem in bench pressing is the tendency for the weightlifter to injure the cervical area of the back by raising the head when executing a repetition. The relatively flat surface of the weight lifting benches know heretofore, moreover, is pressed against the primary curve of the back when a bench press maneuver is being performed. This pressure on the primary curve tends adversely to affect the cervical and lumbar curves to the detriment of the weight lifter.

Attempts have been made heretofore to solve such problems. By way of example, U.S. Pat. Nos. 4,474,370 and 4,621,809 illustrate various exercise devices adapted to alleviate potential injury to persons performing the bench press exercise. As indicated above, however, there remain certain problems with respect to bench pressing which the art has not yet addressed. For example, none of the weight lifting benches known heretofore has been shaped so as to protect the primary curve during the bench press maneuver. Moreover, when a weightlifter grasps and removes the weight from the weigh support structure and executes a repetition, his middle to upper back, i.e. the thoracic region, has a tendency to shift out of position. When this occurs, the weightlifter loses balance and control of the barbell which causes him to lose his form. Because the weightlifter's form during a repetition is more important than the quantity of weight being pressed, the weightlifter is unable to build his pectoral muscles to their maximum potential. In addition improper form during a repetition increases the likelihood that the weightlifter will sustain injuries from the exercise.

SUMMARY OF THE INVENTION

Accordingly, it is the primary object of the present invention to provide a weightlifting bench having a body supporting region which comprises a curved portion adapted to engage and protect the primary curve of the back of the lifter during a bench pressing maneuver.

It is another object of the present invention to provide a weightlifting bench that eliminates the above-noted defects by preventing the thoracic region of the back from being shifted out of position and therefore assisting the weightlifter in maintaining the proper form for maximal pectoral development.

According to one form of the present invention a bench press apparatus is provided for a weightlifting bench for performing a bench press exercise by a user comprising an elongated bench means for supporting the user's body having a first body support section for supporting an area below the lower thoracic region of the user's spine, a substantially longitudinally arcuate portion attached to said first body support section and extending from about the middle thoracic region to the cervical region of the user's body so that said elongated bench means conforms to the upper thoracic curvature of the user's spine, and a second body support section attached to said arcuate portion for supporting the user's head, means attached to said elongated bench means for supporting a barbell, and means for supporting said weight support means and said elongated bench means.

BRIEF DESCRIPTION OF THE DRAWINGS

For a further understanding of the present invention, reference may be had to the accompanying drawings, in which:

FIG. 1 is a perspective view of a thoracic weightlifting bench according to the present invention;

FIG. 2 is a side elevational view of a thoracic weightlifting bench according to the present invention being used by a weightlifter;

DETAILED DESCRIPTION OF THE PREFERRED EMBODIMENT

Figure 3:
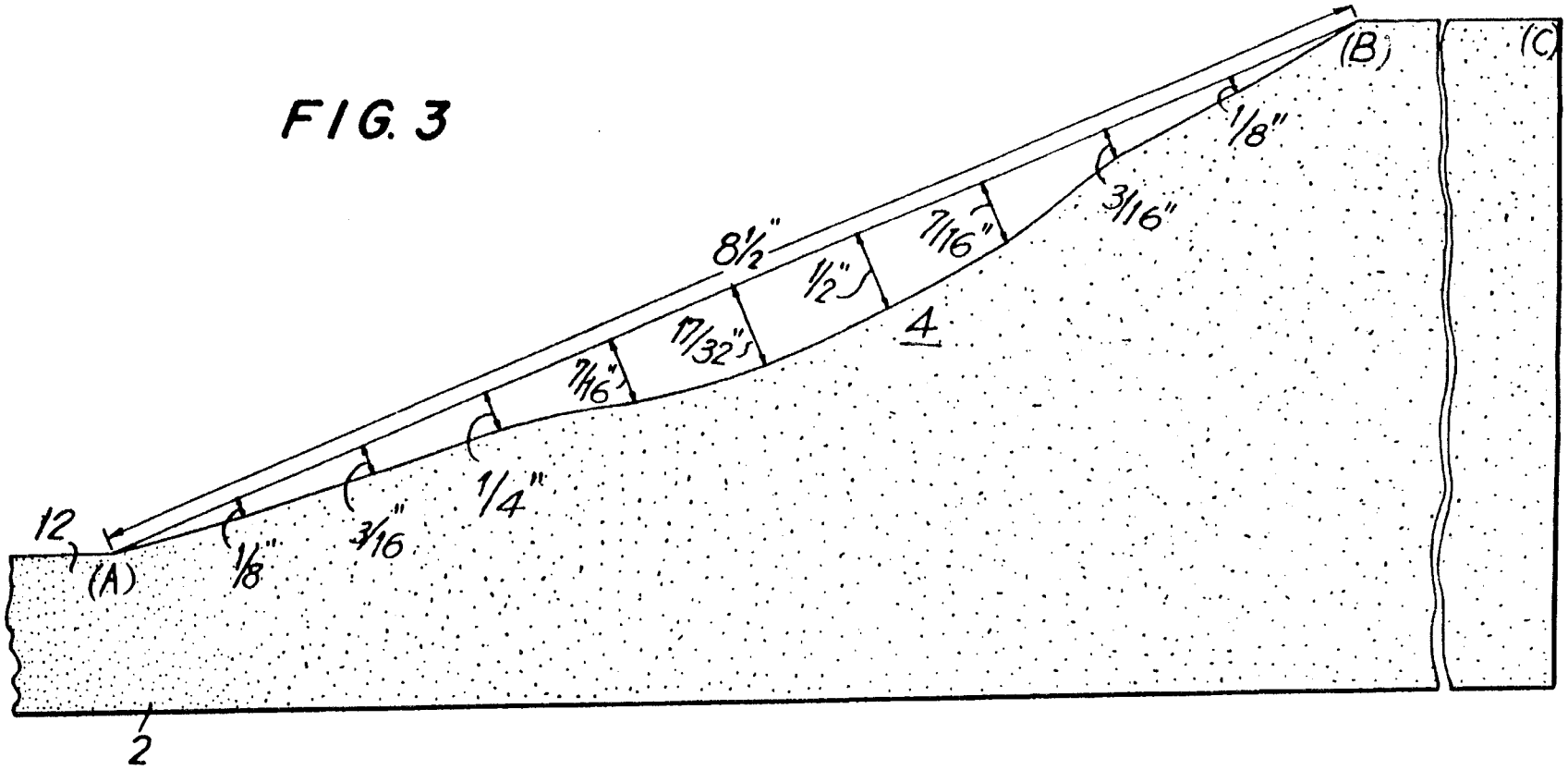
FIG. 3 is an enlarged partial side view showing, in exaggerated condition, the thoracic curvature and measurements thereof for the weightlifting bench according to the present invention.

The present invention will now be described in detail with reference to the drawings.

Referring to FIG. 1, there is shown a weightlifting bench 1 adapted to enable a user to perform the bench press exercise. The bench consists of a substantially planar support portion 2 which at one end curves upwardly to define a thoracic curved portion 4 adapted to conform to the upper thoracic curvature of a user's spine. The curved portion 4 of the bench will be described in greater detail below. The planar support portion 2 and the curved portion 4 thereof may consist of a firm board and a flexible foam material about 1–6 inches thick which covers the board for comfort and to accommodate any differences in spinal contours. The planar support portion 2 is typically about 1 foot wide and about 4 feet long.

Near one end of the support portion 2 are two adjustable barbell support arms 8 that can support heavy weight and can accommodate many different arm extension lengths. The bench also consists of four support legs 10 which support the planar support portion 2. Typically, the support legs 10 are about 1.5 feet long. The support arms 8 are located at the end of the bench which contains the thoracic curved portion 4. Their particular point of attachment to the bench relative to the curved portion may vary, as desired, but they preferably straddle the curved portion 4.

Referring to FIG. 2, there is shown a user employing the weightlifting bench of the present invention. In particular, the thoracic curved portion 4 conforms to the upper thoracic curvature of the user's spine during the bench press exercise.

Referring to FIG. 3, there is shown an enlarged side view of the thoracic curved portion 4 of the bench of the present invention, including actual measurements thereof. The bench may be considered to consist of three discrete sections. The first section defines the planar support 2 which starts at one end of the cushion (the end opposite to the barbell support arms) and ends at approximately the point A (FIG. 3). The second section is the thoracic curved portion 4 which extends from point A to point B. The thoracic curve 4 is substantially arcuate and has a chord defined by points (A) and (B). In the preferred embodiment, the length of the chord (AB) is 8.5 inches, a length sufficient to define a thoracic curve capable of fitting most people. Custom made curvatures may also be utilized as desired. Starting from point (A), the thoracic curvature 4 begins to ascend and the distances measured from points on the curve to points evenly spaced on the chord (AB) increase. The first four measurements are $\frac{1}{8}$, $\frac{3}{16}$, $\frac{1}{4}$ and $\frac{7}{16}$ inches, respectively. The fifth measurement is located at a point spaced substantially at the midpoint of the chord (AB) and is $\frac{17}{32}$ inches long. Through that point, the thoracic curvature 4 continues to ascend but thereafter, the distance from the thoracic curvature 4 to the chord (AB) begins to decrease to $\frac{1}{2}$, $\frac{7}{16}$, $\frac{3}{16}$, and $\frac{1}{8}$ inches, respectively, until the chord and the arcuate curvature 4 intersect at point (B).

The third section of the planar support cushion 2 is a rectangular head support 6. In the preferred embodiment, the head support section is flat, parallel to the first section and extends from point (B) to point (C) the end of the bench.

Figure 4:
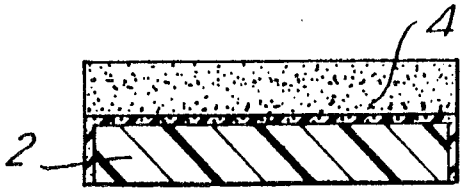
FIG. 4 is a cross sectional view of the thoracic weightlifting bench of the present invention taken along the line 4—4 in FIG. 1.

Referring to FIG. 4, there is shown a cross sectional view of the thoracic curvature 4 of the bench taken along the line 4—4 of FIG. 1. It can be seen that the thoracic curvature 4 is not curved in the lateral direction but only longitudinally.

As described above, the present invention is most commonly used with weightlifting benches that have a flat surface. The present invention, however, can be used on many different types of weightlifting benches such as the incline bench where the upper portion of the board can be elevated or lowered to build and tone other muscles in the pectoral region.

Figure 5:
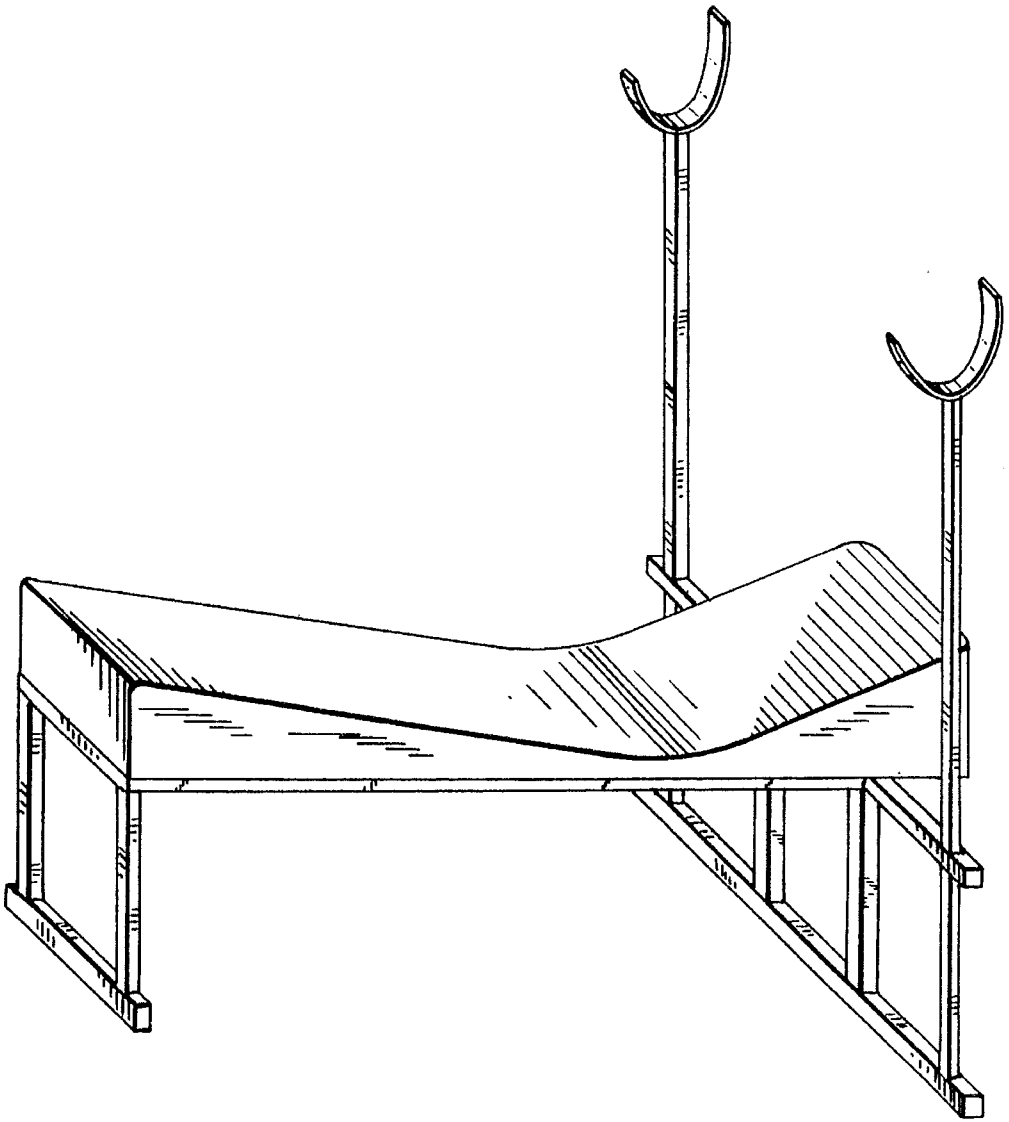
FIG. 5 is a perspective view of a thoracic weightlifting bench according to another embodiment of the present invention.

Referring to FIG. 5, there is shown another embodiment of the present invention. In this embodiment the upper surface of the first body support section is on an incline such that the end portion of the first body support section, which is also an end portion of the elongated bench, is raised above the opposite end of the first body support section. That is the surface of the first body support section is inclined downward from its peak at the end where the user's legs would be towards where the second body support section begins. The second body support section has a longitudinally arcuate portion which conforms to the upper thoracic curvature of the spine for supporting the upper thoracic region of the user.

The third body support section extends from one end of the second body support section to the end of the elongated bench where the user's head will be. The upper surface of the third body support section is at an incline such that it is at its peak at the end coinciding with the end of the elongated bench.

While two preferred embodiments of the present invention have been shown and described, it will be apparent that many modifications and variations could be effected by one skilled in the art without departing from the scope and spirit of the novel concept of the invention, which should be determined by the appended claims.

What is claimed is:

[1. A weightlifting bench for performing a bench press exercise by a user comprising:

an elongated bench means for supporting the user's body having a first body support section for supporting the lower thoracic region of the user, a second body support section having a substantially longitudinally arcuate portion extending from said first body support section and about the middle thoracic region of the user to the cervical region of the user, said arcuate portion comprising a continuously upwardly curved support surface which conforms to the upper thoracic curvature of the user, and which supports and elevates the shoulder area of the user above the user's middle and lower thoracic regions, and a third body support section attached to said arcuate portion for supporting the user's head in an elevated position proximate an end of said bench means;

a weight support means attached to said elongated bench means for supporting a barbell; and a weight support means for supporting said weight support means and said elongated bench means.]

[2. The weightlifting bench of claim 1, in which said first body support section is at a lower level than said third body support section.]

[3. The weightlifting bench of claim 2, in which said first body support section is substantially planar.]

[4. The weightlifting bench of claim 1, wherein said weight support means is an adjustable barbell holder for accommodating varying arm lengths.]

[5. The weightlifting bench of claim 1, wherein said bench support means comprises a plurality of vertical support legs.]

[6. The weightlifting bench press of claim 1, wherein said arcuate portion is a concave curve having a chord defined by a beginning point, a midpoint and an end point of said arcuate portion that has a length of substantially 8.5 inches.]

[7. The weightlifting bench of claim 6, wherein said arcuate portion gradually ascends away from said first body support section toward said end point such that the distance between said arcuate portion and said chord, measured perpendicularly from said chord, changes from zero at said beginning point to $\frac{1}{8}$, $\frac{3}{16}$, $\frac{1}{4}$, $\frac{7}{16}$ and $\frac{17}{32}$ inches at said midpoint, respectively, measured from points on said arcuate portion to evenly spaced point along said chord.]

[8. The weightlifting bench of claim 6, wherein said arcuate portion gradually descends away from said second body support section toward said beginning point such that the distance between said arcuate portion and said chord, measured perpendicularly from said chord, changes from zero at said end point to $\frac{1}{8}$, $\frac{3}{16}$, $\frac{7}{16}$, $\frac{1}{2}$ and $\frac{17}{32}$ inches at said midpoint, respectively, measured from points along said arcuate portion to points evenly spaced along said chord.]

[9. The weightlifting bench of claim 1 in which said third body support section comprises a head support surface elevated above said first and second body support sections.]

10. The weightlifting bench of claim [1] *13*, in which, *relative to a horizontal plane,* said [first body support section] *lower thoracic portion* is inclined from an end contiguous to said [second body support section] *upper thoracic portion* upwards to an end that coincides with an end of said elongated bench [means] that [supports] *is adapted to support* the [user's] *exerciser's* lower body.

11. The weightlifting bench of claim [1] *13*, in which, *relative to a horizontal plane,* said [third body support section] *head portion* is inclined from an end contiguous to said [second body support section] *upper thoracic portion* upwards to an end that coincides with an end of said elongated bench [means] that [supports] *is adapted to support* the [user's] *exerciser's* head.

12. The weightlifting bench of claim [1] *13*, in which- *relative to a horizontal plane,* said [first body support section] *lower thoracic portion* is inclined from an end contiguous to said [second body support section] *upper thoracic portion* upwards to an end that coincides with an end of said elongated bench [means] that [supports] *is adapted to support* the [user's] *exerciser's* lower body and said [third body support section] *head portion* is inclined from an end contiguous to said [second body support section] *upper thoracic portion* upwards to an end that coincides with an end of said elongated bench [means] that [supports] *is adapted to support* the [user's] *exerciser's* head.

*13. A weightlifting bench comprising:*

*an elongated padded bench having first and second longitudinal sides, the bench including:*

*a generally planar lower thoracic portion for supporting the lower thoracic region of an exerciser, the lower thoracic portion defining a base plane;*

*a generally planar head portion for supporting the head of the exerciser, the head portion being at a higher elevation than the lower thoracic portion as measured along a line normal to the base plane, the head portion being offset from the lower thoracic portion so that a projection of the head portion along a line normal to it does not intersect the lower thoracic portion;*

*an upper thoracic portion intersecting a first reference plane only along a first line and a second line, the first and second lines being parallel and defining the first reference plane, each line being continuous from the first side of the bench to the second side, and the first reference plane being slanted with respect to the vertical so as to have an upper side and a lower side, the upper thoracic portion comprising first and second sections for supporting the upper thoracic region of the exerciser, the first and second sections including the first and second lines, respectively, and a third section between the first and second sections, the first and second sections being located symmetrically with respect to each other about a second reference plane parallel to and midway between the first and second lines and perpendicular to the first reference plane, the third section being below the first reference plane and located asymmetrically with respect to the second reference plane;*

*the upper thoracic portion intersecting the lower thoracic portion along the first line and intersecting the head portion along the second line, the distance between the first and second lines being roughly 8.5 inches as measured in the first reference plane; and*

*the lower thoracic portion, upper thoracic portion, and the head portion being flat in cross section perpendicular to the long axis of the bench.*

* * * * *